United States Patent
Mizue et al.

(10) Patent No.: US 11,124,427 B2
(45) Date of Patent: Sep. 21, 2021

(54) METHOD OF PRODUCING TITANIUM OXIDE

(71) Applicant: SHOWA DENKO K. K., Tokyo (JP)

(72) Inventors: Kei Mizue, Toyama (JP); Susumu Kayama, Toyama (JP); Hisao Kogoi, Toyama (JP)

(73) Assignee: SHOWA DENKO K.K., Tokyo (JP)

(*) Notice: Subject to any disclaimer, the term of this patent is extended or adjusted under 35 U.S.C. 154(b) by 68 days.

(21) Appl. No.: 15/769,807

(22) PCT Filed: Dec. 16, 2016

(86) PCT No.: PCT/JP2016/088602
§ 371 (c)(1),
(2) Date: Apr. 20, 2018

(87) PCT Pub. No.: WO2017/111150
PCT Pub. Date: Jun. 29, 2017

(65) Prior Publication Data
US 2018/0237311 A1  Aug. 23, 2018

(30) Foreign Application Priority Data

Dec. 21, 2015 (JP) ................ JP2015-249054

(51) Int. Cl.
*C01G 23/053* (2006.01)

(52) U.S. Cl.
CPC ...... *C01G 23/0536* (2013.01); *C01P 2004/64* (2013.01); *C01P 2006/11* (2013.01); *C01P 2006/12* (2013.01); *C01P 2006/80* (2013.01); *C01P 2006/82* (2013.01)

(58) Field of Classification Search
CPC ................................. C01G 23/0536
See application file for complete search history.

(56) References Cited

U.S. PATENT DOCUMENTS

| 6,627,336 B1 | 9/2003 | Ohmori et al. |
| 8,741,431 B2 | 6/2014 | Mizue et al. |
| 2013/0004771 A1* | 1/2013 | Mizue ............... C01G 23/047 428/402 |

FOREIGN PATENT DOCUMENTS

| CN | 101700907 A | 5/2010 |
| EP | 2 527 299 A1 | 11/2012 |
| EP | 3 048 082 A1 | 7/2016 |
| GB | 1176046 A | 1/1970 |
| JP | 02-196029 A | 8/1990 |
| JP | 02196029 A * | 8/1990 |
| JP | 2007-314418 A | 12/2007 |
| JP | 5021106 B2 | 9/2012 |
| TW | 201509817 A | 3/2015 |
| WO | 99/58451 A1 | 11/1999 |
| WO | 2015/033421 A1 | 3/2015 |

OTHER PUBLICATIONS

Taiwan Office Action for Application No. 105142078 dated Jun. 19, 2017.
International Search Report for PCT/JP2016/088602 dated May 11, 2017 [PCT/ISA/210].
Communication dated Jul. 26, 2019 issued by the China National Intellectual Property Administration in counterpart application No. 201680070236.X.
Communication dated Jul. 30, 2019 issued by the Japanese Patent office in counterpart application No. 2015-249054.

* cited by examiner

Primary Examiner — Sheng H Davis
Assistant Examiner — Michael Forrest
(74) Attorney, Agent, or Firm — Sughrue Mion, PLLC

(57) ABSTRACT

Provided is a method of producing a titanium oxide in which titanium tetrachloride is hydrolyzed using a liquid-phase method. This method includes a step of adding an aqueous titanium tetrachloride solution to warm water having a higher temperature than the aqueous titanium rachloride solution, in which in the step, the temperature of the warm water is 30° C. to 95° C. and the aqueous titanium tetrachloride solution is added to the warm water such that an increase rate of titanium atomic concentration in the warm water is 0.25 mmol/L/min to 5.0 mmol/L/min, and a titanium atomic concentration in the warm water after the step is 280 mmol/L or lower.

4 Claims, No Drawings

METHOD OF PRODUCING TITANIUM OXIDE

FIELD OF INVENTION

The present invention relates to a titanium oxide and a method of producing the same.

This application is a National Stage of International Application No. PCT/JP2016/088602, filed on Dec. 16, 2016, which claims priority from Japanese Patent Application No. 2015-249054, filed on Dec. 21, 2015, the content of which is incorporated herein by reference.

DESCRIPTION OF RELATED ART

A titanium oxide is used in various applications such as a photocatalyst material, a dielectric material, or an electrode material for a lithium ion battery. In most of these applications, a titanium oxide is used in the form of a slurry.

In most of these applications where a titanium oxide is used in the form of a slurry, a step of loosening aggregation of a titanium oxide through a dispersion operation such as stirring or ultrasonic dispersion is provided. Therefore, it is thought that the dispersibility of a titanium oxide in a polar solvent such as water has a large effect on product characteristics thereof. In general, titanium oxide particles having a small particle size are likely to aggregate, and titanium oxide particles having a large particle size exhibit high dispersibility.

On the other hand, in the above-described application fields of a titanium oxide, a reduction in the particle size of a titanium oxide is required. Accordingly, even in a case where a titanium oxide has a small particle size, it is necessary that the dispersibility thereof in a polar solvent such as water is excellent.

To that end, for example, a method of increasing the hydrophilicity of titanium oxide particle surfaces, that is, increasing the water adsorption amount per unit area may be used. In a case where a titanium oxide having high hydrophilicity can be obtained, the water adsorption amount increases such that an effect of actively causing water to be adsorbed as in a so-called capillary phenomenon is obtained. It is thought that, due to this effect, a rate of loosening aggregation of a titanium oxide when used in the form of a slurry is increased such that the dispersibility thereof is improved.

As a method of improving the hydrophilicity of particle surfaces, a method of increasing the number of hydroxyl groups in particle surfaces may be considered. In order to increase the number of hydroxyl groups in particle surfaces, it is effective to control the crystal form of a titanium oxide. The crystal form of a titanium oxide is roughly classified into three types: an anatase type, a brookite type, and a rutile type. Surfaces of titanium oxide particles are covered with hydroxyl groups which are chemically bonded to a titanium atom or an oxygen atom. It is said that the number of hydroxyl groups per unit area of particle surfaces is the most in an anatase type, and it is thought that the hydrophilicity is also the highest in an anatase type.

As a method of producing a titanium oxide, a liquid-phase method of adding titanium tetrachloride to warm water to be hydrolyzed is known. PTL 1 describes that titanium tetrachloride is hydrolyzed in the presence of Bronsted acid to produce a titanium oxide sol including a Bronsted base.

PTL 2 describes a method of producing a titanium oxide in which sulfuric acid is added in a state where hydrolysis progresses to some extent. According to this method, a titanium oxide having fine particles (a small particle size) and including a large amount of anatase type crystals is obtained.

PTL 3 describes that water at 80° C. or higher and an aqueous titanium tetrachloride solution at normal temperature are mixed with each other and cooled within a short period of time so as to prevent aggregation of particles and to prevent the change of the crystal form from anatase to rutile.

CITATION LIST

Patent Literature

[PTL 1] PCT International Publication NO. WO99/58451
[PTL 2] Japanese Unexamined Patent Application, First Publication No. 2007-314418
[PTL 3] Japanese Patent No. 5021106

SUMMARY OF THE INVENTION

However, in PTL 1, it is assumed that a film is formed using a titanium sol as it is. The titanium sol is not suitable for dispersing it in the form of powder in water again, is difficult to handle as a product, and has disadvantageous effects in transport and management costs. In PTL 2, the step of adding sulfuric acid after the hydrolysis is provided, and the costs may increase due to an increase in the number of processes and complex facilities. In PTL 3, a titanium oxide having a large specific surface area, that is, having a small particle size and a high anatase content is obtained. However, the water adsorption amount is insufficient, and there is a room for improvement of dispersibility.

Further, even when the dispersibility is excellent, for example, in a case where the bulk density is low, particles are scattered by a slight air flow. Therefore, there is a problem in handleability during the formation of a slurry, and the productivity deteriorates, which may cause an increase in costs due to facilities for solving the problem.

The present invention has been made in consideration of the above-described circumstances, and an object thereof is to provide: an inexpensive titanium oxide having high dispersibility in a polar solvent such as water despite a small particle size thereof and having excellent handleability; and a method of producing the same.

Solution to Problem

As described above, as a method of improving the dispersibility of titanium oxide particles, for example, a method of increasing the water adsorption amount in particle surfaces is used. Further, in order to secure the above-described handleability, it is also necessary to control the bulk density. In a case where the bulk density is high, the handleability is excellent. However, in a case where the bulk density is excessively high, the water adsorption amount decreases.

That is, by increasing the water adsorption amount in particle surfaces and controlling the bulk density to be in an appropriate range, titanium oxide particles having high dispersibility in a polar solvent such as water despite a small particle size thereof and having excellent handleability are obtained. Therefore, the present inventors investigated a method of producing a titanium oxide having ultrafine particles using a liquid-phase method in various ways and thus found that, by adding an aqueous titanium tetrachloride solution to warm water at a far slower addition rate than the related art, titanium oxide particles exhibiting a significantly higher water adsorption amount than the related art and having a suitable bulk density for dispersion are obtained.

The present invention provides the following means.

[1] According to an aspect of the present invention, there is provided a method of producing a titanium oxide in which titanium tetrachloride is hydrolyzed using a liquid-phase method, the method including:

a step of adding an aqueous titanium tetrachloride solution to warm water having a higher temperature than the aqueous titanium tetrachloride solution, in which in the step, the temperature of the warm water is 30° C. to 95° C. and the aqueous titanium tetrachloride solution is added to the warm water such that an increase rate of titanium atomic concentration in the warm water is 0.25 mmol/L/min to 5.0 mmol/L/min, and a titanium atomic concentration in the warm water after the step is 280 mmol/L or lower.

[2] The method of producing a titanium oxide according to [1], in which the titanium tetrachloride may be hydrolyzed in the presence of a water-soluble organic acid having a carboxyl group and/or an inorganic acid.

[3] The method of producing a titanium oxide according to [2], in which the organic acid and/or the inorganic acid may be a polyacid.

[4] The method of producing a titanium oxide according to [2] or [3], wherein the organic acid and/or the inorganic acid may be added to the aqueous titanium tetrachloride solution in advance before adding the aqueous titanium tetrachloride solution to the warm water.

[5] The method of producing a titanium oxide according to any one of [1] to [4], may include a dechlorination step of separating a titanium oxide and hydrochloric acid, which are produced in the step of adding the aqueous titanium tetrachloride solution, from each other using at least one selected from the group consisting of an ultrafiltration membrane, a reverse osmosis membrane, an ion exchange resin, and an electrodialytic membrane,

[6] According to an aspect of the present invention, there is provided a titanium oxide, in which a water adsorption amount per unit area, which is calculated by dividing a water absorption amount per 1 mg of the titanium oxide [(mg·H$_2$O)/(mg·TiO$_2$)] at a relative humidity (RH) of 90% and 25° C. by a BET specific surface area [m$^2$/(mg·TiO$_2$)], is 0.7 mg·H$_2$O/m$^2$ or higher, and a bulk density is 0.2 g/ml to 0.8 g/ml.

[7] The titanium oxide according to [6], in which an anatase type crystal may be contained at a rate of 85 mass % or higher.

[8] The titanium oxide according to [6] or [7], in which a range of the BET specific surface area may be 0.2 m$^2$/mg to 0.5 m$^2$/mg.

[9] The titanium oxide according to any one of [6] to [8], in which the water absorption amount may be 0.2 {(mg·H$_2$O)/(mg·TiO$_2$)} or more.

[10] According to an aspect of the present invention, there is provided a composition including the titanium oxide according to any one of [6] to [9].

[11] According to an aspect of the present invention, there is provided a dielectric material including the titanium oxide according to any one of [6] to [9].

[12] According to an aspect of the present invention, there is provided a material for a solar cell including the titanium oxide according to any one of [6] to [9].

[13] According to an aspect of the present invention, there is provided an electrode material for a lithium ion battery including the titanium oxide according to any one of [6] to [9].

According to the present invention, an inexpensive titanium oxide having high dispersibility in a polar solvent such as water despite a small particle size thereof and having excellent handleability; and a method of producing the same can be provided.

DETAILED DESCRIPTION OF THE INVENTION

Hereinafter, a titanium oxide and a method of producing the same according to an embodiment of the present invention will be described.

The details exemplified in the following description are merely exemplary, and the invention is not limited thereto. Appropriate modifications can be made within a range where the effects of the present invention are exhibited. In the embodiment, the titanium oxide refers to a titanium oxide (IV; TiO$_2$).

<Titanium Oxide>

In the titanium oxide according to the embodiment, a water adsorption amount per unit area which is calculated by dividing a water absorption amount per 1 mg of the titanium oxide [(mg·H$_2$O)/(mg·TiO$_2$)] (hereinafter, also referred to simply as "water absorption amount") at a relative humidity (RH) of 90% and 25° C. by a BET specific surface area. [m$^2$/(mg·TiO$_2$)] (that is, a water absorption amount [(mg·H$_2$O)/mg·TiO$_2$)]/a BET specific surface area [m$^2$/(mg·TiO$_2$)]) is 0.7 (mg·H$_2$O)/m$^2$ or higher.

Here, the water absorption amount [(mg·H$_2$O)/(mg·TiO$_2$)] refers to a ratio of the mass of adsorbed water to the mass of the dry titanium oxide. Specifically, the water absorption amount [(mg·H$_2$O)/(mg·TiO$_2$)] is expressed by "(the mass of water adsorbed on the dry titanium oxide)/(the mass of the dry titanium oxide). Further, (the mass of water adsorbed on the dry titanium oxide) is expressed by "(the mass of the titanium oxide which reaches an adsorption equilibrium of water vapor by being left to stand in a thermohygrostat at 25° C. and a relative humidity (RH) of 90% for 5 hours or longer)–(the mass of the dry titanium oxide)"

The water adsorption amount per unit area contributes to the dispersibility of a titanium oxide in a polar solvent such as water, and the more the water adsorption amount per unit area, the higher the dispersibility. Therefore, the water adsorption amount per unit area is preferably 0.8 (mg·H$_2$O)/m$^2$ or more and more preferably 0.9 (mg·H$_2$O)/m$^2$ or more.

On the other hand, in a case where the water adsorption amount per unit area is excessively large, powder has a cream shape when dispersed in a solvent, and the workability may deteriorate. Therefore, the water adsorption amount per unit area is preferably 1.5 (mg·H$_2$O)/m$^2$ or less.

The particle size (average primary particle size) is inversely proportional to the BET specific surface area. In a titanium oxide having anatase type crystals, a relationship between the particle size and the BET specific surface area is expressed by the following expression.

Particle Size [nm]=6/{Density of Titanium Oxide: [g/cm$^3$]×BET Specific Surface Area [m$^2$/mg]}

In the case of anatase type crystals, the density of the titanium oxide is 4.00 g/cm$^3$.

As described above, in the application fields of the titanium oxide, a reduction in the particle size of the titanium oxide is required. The BET specific surface area corresponding to a preferable particle size as a product is preferably 0.200 m²/mg·TiO₂ or more (particle size: 7.5 nm or less), more preferably 0.280 m²/mg·TiO₂ or more (particle size: 5.4 nm or less), and still more preferably 0.300 m²/mg or more (particle size: 5.0 nm or less). On the other hand, in a case where the particle size is excessively small, the particles are likely to aggregate, aid the dispersibility deteriorates. Therefore, the BET specific surface area is preferably 0.500 m²/mg·TiO₂ or less (particle size: 3.0 nm or more), more preferably 0.450 m²/mg·TiO₂ or less (particle size: 3.3 nm or more), and still more preferably 0.420 m²/mg·TiO₂ or less (particle size: 3.6 nm or more).

In order to improve the dispersibility of the titanium oxide in water, the water absorption amount per 1 mg of the titanium oxide is preferably 0.20 (mg·H₂O)/(mg·TiO₂) or more, more preferably 0.26 (mg·H₂O)/(mg·TiO₂) or more, and still more preferably 0.30 (mg·H₂O)/(mg·TiO₂) or more.

It is thought that the number of hydroxyl groups per unit area of titanium oxide particle surfaces is the most in an anatase type. As the number of hydroxyl groups increases, the titanium oxide exhibits higher hydrophilicity due to an interaction between the hydroxyl groups and water molecules. It is thought that, in a case where higher hydrophilicity is obtained, the water adsorption amount is also improved. Accordingly, it is thought that, as the anatase type crystal content increases, the water adsorption amount of the titanium oxide works more favorably. Therefore, the anatase type crystal is preferably contained at a rate of 85 mass % or higher. Further, in order to obtain an excellent water adsorption amount, the anatase content in the titanium oxide is more preferably 90 mass % or higher and most preferably 100 mass %, that is, it is most preferable that the titanium oxide consists of a single phase of an anatase type.

The residual chlorine content is preferably 0.1 mass % or lower. Since chlorine is a corrosive component, the above-described range is set in order to prevent corrosion or deformation of a substrate in a case where the titanium oxide is used as a dielectric material, a material for a solar cell, or a material for a photocatalyst.

The bulk density is 0.2 g/ml to 0.8 g/ml. In powder having a low bulk density, a large amount of air is present between particles. Therefore, a long period of time is required to replace air present between the particles with a solvent, and it is difficult to disperse the titanium oxide in a polar solvent such as water. In addition, in a case where the bulk density is high, the handleability is excellent. However, in a case where the bulk density is excessively high, the water adsorption amount decreases. Further, in order to improve the effect, the bulk density is preferably 0.5 g/ml to 0.8 g/ml and more preferably 0.6 g/ml to 0.8 g/ml.

<Method of Producing Titanium Oxide>

In the method of producing a titanium oxide, titanium tetrachloride is hydrolyzed using a liquid-phase method. This method includes a step of adding an aqueous titanium tetrachloride solution to warm water having a higher temperature than the aqueous titanium tetrachloride solution, in which in the step, the temperature of the warm water is 30° C. to 95° C. and the aqueous titanium tetrachloride solution is added to the warm water such that an increase rate of titanium atomic concentration in the warm water is 0.25 mmol/L/min to 5.0 mmol/L/min, and a titanium atomic concentration in the warm water after the step is 280 mmol/L or lower.

It is thought that, in this step, particles are formed after the titanium tetrachloride is hydrolyzed to reach a supersaturation state (particle nuclei are not formed in a state where the titanium concentration is higher than a value required to form particles)

In the step, the titanium tetrachloride is hydrolyzed after added to the warm water. Therefore, the temperature of the aqueous titanium tetrachloride solution is set to be lower than that of the warm water (that is, the temperature of the warm water is set to be higher than that of the aqueous titanium tetrachloride solution). The reason for this is to promote the progress of the hydrolysis in the warm water and to prevent the progress of the hydrolysis in the aqueous titanium tetrachloride solution.

Specifically, the temperature of the aqueous titanium tetrachloride solution is preferably lower than 35° C., more preferably 30° C. or lower, and still more preferably 25° C. or lower but is not limited thereto as long as the progress of the hydrolysis can be prevented by conditions such as a concentration.

On the other hand, the temperature of the warm water is managed in a temperature of 30° C. to 95° C. The temperature of the warm water is preferably 35° C. to 90° C., and the upper limit thereof is more preferably 80° C. or lower and still more preferably 75° C. or lower. However, the temperature of the warm water is not limited as long as the progress of the hydrolysis can be promoted by conditions such as a concentration. By controlling the temperature range as described above, the degree of supersaturation and the nucleus forming temperature are maintained in appropriate ranges. As a result, the particle size and the crystal form can be controlled while avoiding excessive aggregation and growth.

As a specific example of a method of adding the aqueous titanium tetrachloride solution, for example, a method of adding titanium tetrachloride dropwise to a liquid surface of the warm water, but the method is not limited thereto. For example, a method of supplying the aqueous titanium tetrachloride solution to the warm water using a pump or the like is also used.

Here, the titanium atomic concentration in the warm water is a molar concentration which is calculated from the mol number of titanium atoms included in a titanium compound in the warm water. By controlling the increase rate of titanium atomic concentration in the warm water, a sufficient period of time for diffusing heat of dilution is secured, and nuclei can be uniformly formed. The reason for this is thought to be as follows. In a case where the addition rate of the aqueous titanium tetrachloride solution is excessively fast, the degree of supersaturation of titanium increases excessively, the particle concentration is high during nucleus formation, and thus dense aggregates are formed. Therefore, the water adsorption amount of the titanium oxide particles decreases. On the other hand, in a case where the addition rate of the aqueous titanium tetrachloride solution is excessively slow, the productivity deteriorates.

"The increase rate of titanium atomic concentration in the warm water" refers to a time-average increase rate of titanium atomic concentration from the start to end of the addition of the aqueous titanium tetrachloride solution to the warm water. The addition rate of the aqueous titanium tetrachloride solution is preferably constant but is not necessarily constant. In some cases, the aqueous titanium tetrachloride solution may be added in pulses. In this case, the time-average increase rate of titanium atomic concentration is adjusted to be 0.2.5 mmol/L/min to 5.00 mmol/L/min.

After the end of the addition of the aqueous titanium tetrachloride solution, the titanium atomic concentration is adjusted to be 280 mM (mmol/L) or lower. In a case where the titanium atomic concentration is 280 mM (mmol/L) or lower, a decrease in the water adsorption amount can be avoided. In addition, the titanium atomic concentration is preferably 80 mM or higher in consideration of the productivity. Further, the titanium atomic concentration is more preferably 80 mM to 250 mM and still more preferably 80 mM to 230 mM.

After the dropwise addition of the titanium tetrachloride, the warm water is cooled. In a case where the warm water is slowly cooled, the bulk density of the obtained titanium oxide powder may decrease. Therefore, it is preferable that the warm water is rapidly cooled after the dropwise addition. Next, optionally, the solution is neutralized with alkali such as ammonia water, and then the titanium oxide is collected by filtration. The collected titanium oxide is optionally washed with ion exchange water or the like and then is dried. As a result, titanium oxide powder is obtained.

A water-soluble organic acid having a carboxyl group or an inorganic acid may be added to the warm water or the aqueous titanium tetrachloride solution. Examples of the organic acid include citric acid, malic acid, lactic acid, glycolic acid, and glycine. Examples of the inorganic acid include sulfuric acid and nitric acid. That is, at least one of the water-soluble organic acid having a carboxyl group or the inorganic acid may be added to the warm water or the aqueous titanium tetrachloride solution. As a result, the hydrolysis reaction can be suppressed, and the addition is effective from the viewpoint of improving the hydrophilicity. In particular, an additive including a polyvalent ion such as citric acid, malic acid, or sulfuric acid works effectively from the viewpoint of improving the hydrophilicity. The reason for this is that, the additive is adsorbed on surfaces of the produced titanium oxide particles to prevent contact between the particles such that the number of hydroxyl groups effective for adsorption is increased in the surfaces.

The method of producing a titanium oxide according to the embodiment may further include a dechlorination step of separating a titanium oxide and hydrochloric acid, which are produced in the hydrolysis reaction, from each other using at least one selected from the group consisting of an ultrafiltration membrane, a reverse osmosis membrane, an ion exchange resin, and an electrodialytic membrane.

In the above-described steps according to the embodiment, the titanium tetrachloride particles are formed after the titanium tetrachloride is hydrolyzed such that a portion of titanium in the warm water reach a supersaturation state. Further, the titanium tetrachloride added after the formation of particles maintains the degree of supersaturation such that the growth of particles is controlled.

The titanium oxide produced as described above has a small particle size. Since this titanium oxide has a high anatase content, the hydrophilicity is high and the water adsorption amount per unit area is large. In addition, the titanium oxide has a bulk density in a preferable range and contributes excellent handleability in a solvent. Due to the above-described configurations, the titanium oxide powder according to the embodiment exhibits high dispersibility in a polar solvent such as water and has excellent handleability. In addition, the steps according to the embodiment do not require large facilities and a number of processes and thus can be performed at a low cost.

According to the embodiment, a titanium oxide having high dispersibility in a polar solvent such as water despite a small particle size thereof and having excellent handleability; and a method of producing the same can be provided at a low cost. Even in a case where the titanium oxide is stored in the form of powder and is converted into a slurry during processing, the dispersibility thereof in a polar solvent such as water is high and the workability is excellent. Therefore, it is thought that the titanium oxide according to the embodiment is significantly suitable for use in a dielectric material, a material for a solar cell, or an electrode material for a lithium battery.

EXAMPLES

Hereinafter, examples according to the present invention will be described, but the present invention is not limited to these examples.

<Method of Preparing Titanium Oxide>

Titanium oxides were prepared as described below in Examples 1 to 7 and Comparative Examples 1 to 6. Conditions of each of the examples are shown in the item "Production conditions" of Table 1.

Example 1

850 mL of ion exchange water was poured into a reaction vessel equipped with a comb-shaped stirrer. The comb-shaped stirrer was rotated at about 300 rpm, and the ion exchange water was heated to 35° C. using an external heater. As a result, warm water was obtained. While maintaining the temperature of the warm water at a fixed temperature, an aqueous titanium tetrachloride solution (titanium concentration: 18 mass %) at normal temperature (20° C.) was added dropwise to the warm water. Here, the titanium concentration [mass %] in the aqueous titanium tetrachloride solution is a concentration which is calculated in terms of the mass of titanium components (Ti) including the mass of titanium tetrachloride ($TiCl_4$). Once the amount of the aqueous titanium tetrachloride solution reached 20 g, the dropwise addition was stopped, and then the mixed solution was cooled immediately. The dropwise addition was performed for 44 minutes at a fixed rate. The titanium atomic concentration in the warm water after the end of the dropwise addition (that is, the titanium atomic concentration calculated based on the amount of the titanium tetrachloride added and the volume of the warm water measured during the dropwise addition of the aqueous titanium tetrachloride solution) was 88 mM. Accordingly, the time-average increase rate of titanium atomic concentration in the warm water during the warm water was 2.0 mmol/L/min. A volume change in the volume of the warm water before and after the dropwise addition was small at about 10 mL. Therefore, the actual increase rate of titanium atomic concentration was substantially the same as the time-average value between a value measured (maximum value) immediately after the start of the dropwise addition and a value measured (minimum value) immediately before the end of the dropwise addition and, even in Comparative Example 4 (a case where the total amount of the aqueous titanium tetrachloride solution added dropwise was large), was ±0.1 mmol/L/min (mmol/L·(min)). After cooling, the solution was neutralized with ammonia water and was filtered through an ultrafiltration membrane to collect powder. Next, the powder was washed with ion exchange water and was dried using an oven at 80° C. As a result, titanium oxide powder was obtained.

Examples 2 to 7

In Examples 2 to 7, titanium oxides were prepared using substantially the same method as in Example 1, except that production conditions were changed. Here, regarding Examples 2 to 7, only different conditions from those of Example 1 will be described.

In Example 2, the temperature of the ion exchange water (warm water) was set as 75° C. In Example 3, the time-average increase rate of titanium atomic concentration was set as 0.5 mmol/L/min (that is, the dropwise addition time was set as 176 minutes). In Example 4, the time-average increase rate of titanium atomic concentration was set as 0.3 mmol/L/min (dropwise addition time: 293 minutes and 20 seconds). In Example 5, the time-average increase rate of titanium atomic concentration was set as 4.4 mmol/L/min (dropwise addition time: 20 minutes). In Example 6, the amount of the aqueous titanium tetrachloride solution added was 50 g, and the titanium atomic concentration measured after the end of the dropwise addition was 216 mmol/L (dropwise addition time: 108 minutes). In Example 7, the temperature of the ion exchange water (warm water) was set as 90° C.

Example 8

850 mL of ion exchange water was poured into a reaction vessel equipped with a comb-shaped stirrer. The comb-shaped stirrer was rotated at about 300 rpm, and the ion exchange water was heated to 75° C. using an external heater. As a result, warm water was obtained.

Before adding an aqueous titanium tetrachloride solution (titanium concentration: 18 mass %) to the warm water, citric acid monohydrate was added to the warm water such that the amount of citric acid was 1 mol with respect to 1 mol of titanium.

In the step of adding the aqueous titanium tetrachloride solution dropwise, as in Example 1, the amount of the aqueous titanium tetrachloride solution added was 20 g (that is, the titanium atomic concentration measured after the dropwise addition was 88 mM), the dropwise addition was performed for 44 minutes at a fixed rate, and then the mixed solution was cooled immediately after the dropwise addition. Accordingly, the time-average increase rate of titanium atomic concentration in the warm water during the warm water was 2.0 mmol/L/min.

Example 9

In Example 9, a titanium oxide was prepared under the same conditions as in Example 8, except that citric acid of Example 8 was changed to malic acid.

Example 10

In Example 10, a titanium oxide was prepared under the same conditions as in Example 8, except that citric acid of Example 8 was changed to sulfuric acid.

Comparative Example 1 to 4

Regarding Comparative Examples 1 to 4, only different conditions from those of Example 1 will be described.

In Comparative Example 1, the temperature of the ion exchange water was set as 98° C. In Comparative Example 2, the time-average increase rate of titanium atomic concentration was set as 8.8 mmol/L/min (dropwise addition time: 10 minutes). In Comparative Example 3, the time-average increase rate of titanium atomic concentration was set as 0.2 mmol/L/min (dropwise addition time: 440 minutes). In Comparative Example 4, the amount of the aqueous titanium tetrachloride solution added was 70 g, and the titanium atomic concentration measured after the end of the dropwise addition was 300 mmol/L (dropwise addition time: 150 minutes).

Comparative Example 5

In Comparative Example 5, a commercially available titanium oxide (SUPER-TITANIA (registered trade name) F-6, manufactured by Showa Denko K.K.) was prepared.

Comparative Example 6

In Comparative Example 6, a titanium oxide was prepared under the following conditions described in Example 1 of PTL 3.

690 mL of ion exchange water was poured into a reaction vessel equipped with a comb-shaped stirrer and was pre-heated to 95° C. The ion exchange water was stirred at about 300 rpm and was heated. While maintaining the temperature of the ion exchange water at 95° C., 50 g of an aqueous titanium tetrachloride solution (Ti concentration: 18 mass %) at normal temperature (20° C.) was added dropwise to the ion exchange water for 30 seconds. The components in the reaction vessel was stirred and mixed with each other. The time-average increase rate of titanium atomic concentration was 530 mmol/L/min, and the titanium atomic concentration measured after the end of the dropwise addition was 265 mmol/L. Immediately after added dropwise, the titanium tetrachloride was uniformly mixed with water. Therefore, the dropwise addition time was similar to the mixing time. Even after poured into the reaction vessel, the mixed solution was held at 95° C. for 4 minutes. The reaction vessel was cooled to 50° C. in an ice bath within 1 minute (40 seconds was required to cool the reaction vessel to 60° C.). Hydrochloric acid produced in the reaction was removed by an electrodialyzer to obtain an titanium oxide sol. The titanium oxide sol was dried using a dryer at 100° C. and was crushed in a mortar to obtain a titanium oxide powder.

<Method of Evaluating Titanium Oxide>

Samples prepared using the above-described methods were evaluated in various ways. The evaluation results are shown in Table 1. The details of the evaluation and the methods will be described below.

(Measurement of Crystal Contents)

By performing X-ray diffraction measurement on the dry powder of each of the titanium oxides, various crystal contents were calculated from the following expressions based on a peak height corresponding to anatase type crystals (abbreviated as Ha), a peak height corresponding to brookite type crystals (abbreviated as Hb), and a peak height corresponding to rutile type crystals (abbreviated as Hr).

Anatase Content (%)={Ha/(Ha+Hb+Hr)}×100
Brookite Content (%)={Hb/(Ha+Hb+Hr)}×100
Rutile Content (%)={Hr/(Ha+Hb+Hr)}×100

The powder X-ray diffraction was performed using "X'pert PRO" (manufactured by PANalytical B.V.) as a measuring device, a silver target, and Cu-K$\alpha$1 rays under conditions of tube voltage: 45 kV, tube current: 40 mA, measurement range 2θ:10 to 80 deg, sampling width: 0.0167 deg, and scanning rate: 0.0192 deg/s.

(Elemental Analysis)

In each of Examples and Comparative Examples, the contents of chlorine (Cl), sulfur (S), and silicon (Si) were measured using the following methods.

Regarding chlorine (Cl), a hydrofluoric acid aqueous solution was added the titanium oxide and was heated in a microwave to dissolve it, and the obtained solution was measured by potentiometric titration using silver nitrate.

Regarding sulfur (S), the titanium oxide was fired using a high-frequency induction furnace, and the measurement was performed using an infrared absorption method.

Regarding silicon (Si), the measurement was performed by X-ray fluorescence (XRF) spectrometry.

(Measurement of Specific Surface Area)

The specific surface area S ($m^2$/g) was measured using the one-point BET method with specific surface area measuring device (model: FLOWSORB II 2300, manufactured by Shimadzu Corporation).

(Measurement of Water Absorption Amount)

10 g of the titanium oxide was placed on a glass Petri dish and was dried in a thermostat under reduced pressure at 120° C. for 2 hours. At this time, the mass M1 of the titanium oxide was measured. Next, the mass $M_2$ of the titanium oxide which reached an adsorption equilibrium of water vapor was measured by being left to stand in a thermohygrostat at 25° C. and a relative humidity (RH) of 90% for 5 hours or longer. The mass of M3 of water adsorbed was obtained from a difference $M_2$-$M_1$ between the above measured values. Next, the water absorption amount per 1 mg of the titanium oxide [(mg·$H_2O$)/(mg·$TiO_2$)] was obtained from the following expression.

Water Absorption Amount per 1 mg of Titanium Oxide

[(mg·$H_2O$)/(mg·$TiO_2$)]={(Mass $M_3$ of Water Adsorbed on Dry Titanium Oxide)/(Mass $M_1$ of Dry Titanium Oxide)}.

In addition, as described above, the water adsorption amount per unit area [(mg·$H_2O$)/$m_2$] was obtained from "Water Absorption Amount [(mg·$H_2O$)/(mg·$TiO_2$)]/BET Specific Surface Area [($m^2$(mg·$TiO_2$)]".

(Measurement of Bulk Density)

After mechanically tapping a vessel filled with the titanium oxide powder, the bulk density was measured. Specifically, a 100 mL constant-volume vessel equipped with an auxiliary tube was filled with the titanium oxide powder and was tapped 180 times for 3 minutes at a tapping stroke of 20 mm, and then the weight of the powder was measured. As a result, the bulk density was obtained.

(Evaluation of Dispersibility)

5 g of a dispersant POIZ 532A (trade name, manufactured by Kao Corporation) was added while stirring 470 ml of water with a magnetic stirrer. Further, 25 g of the prepared titanium oxide was added, and the components were stirred and mixed with each other for 10 minutes to form a slurry. This slurry was put into a glass measuring cylinder and was left to stand to evaluate whether or not the slurry had precipitation properties. The bottom of the measuring cylinder was observed after a standing time of 1 hour and after a standing time of 5 hours.

A case where a precipitate was observed after 1 hour was evaluated as "x", a case where a precipitate was observed after 5 hours was evaluated as "Δ", and a case where a precipitate was not observed even after 5 hours was evaluated as "o".

TABLE 1

| | Production Conditions | | | | | | | Elemental Analysis | | |
| | Temperature of Warm Water ° C. | Increase Rate of Ti Atomic Concentration (Time-Average) mmol/L/min | Ti Atomic Concentration after Dropwise Addition mM | Additive | Crystal Content | | | Chlorine | Silicon | Sulfur |
| | | | | | Anatase mass % | Brookite mass % | Rutile mass % | Cl mass % | Si mass % | S mass % |
|---|---|---|---|---|---|---|---|---|---|---|
| Example 1 | 35 | 2.0 | 88 | None | 100 | 0 | 0 | <0.01 | <0.02 | <0.03 |
| Example 2 | 75 | 2.0 | 88 | None | 100 | 0 | 0 | <0.01 | <0.02 | <0.03 |
| Example 3 | 35 | 0.5 | 88 | None | 100 | 0 | 0 | <0.01 | <0.02 | <0.03 |
| Example 4 | 35 | 0.3 | 88 | None | 100 | 0 | 0 | <0.01 | <0.02 | <0.03 |
| Example 5 | 35 | 4.4 | 88 | None | 100 | 0 | 0 | <0.01 | <0.02 | <0.03 |
| Example 6 | 35 | 2.0 | 216 | None | 100 | 0 | 0 | <0.01 | <0.02 | <0.03 |
| Example 7 | 90 | 2.0 | 38 | None | 85 | 15 | 0 | <0.01 | <0.02 | <0.03 |
| Example 8 | 75 | 2.0 | 88 | Citric Acid | 100 | 0 | 0 | 0.02 | <0.02 | <0.03 |
| Example 9 | 75 | 2.0 | 88 | Malic Acid | 100 | 0 | 0 | 0.02 | <0.02 | <0.03 |
| Example 10 | 75 | 2.0 | 88 | Sulfuric Acid | 100 | 0 | 0 | 0.02 | <0.02 | <0.03 |
| Comparative Example 1 | 98 | 2.0 | 88 | None | 82 | 15 | 3 | <0.01 | <0.02 | <0.03 |
| Comparative Example 2 | 35 | 8.8 | 88 | None | 100 | 0 | 0 | <0.01 | <0.02 | <0.03 |
| Comparative Example 3 | 35 | 0.2 | 88 | None | 100 | 0 | 0 | <0.01 | <0.02 | <0.03 |
| Comparative Example 4 | 35 | 2.0 | 300 | None | 80 | 2 | 18 | 0.02 | <0.02 | <0.03 |
| Comparative Example 5 | Commercially Available Product | | | None | 97 | 0 | 3 | 0.08 | <0.01 | <0.01 |
| Comparative Example 6 | 95 | 530 | 255 | None | 97 | ≤3 | ≤3 | <0.1 | <0.002 | <0.001 |

TABLE 1-continued

|  | Powder Characteristics | | | | | |
| --- | --- | --- | --- | --- | --- | --- |
|  | Water Absorption Amount (mg · H₂O)/(mg · TiO₂) | Bet Specific Surface Area m²/(mg · TiO₂) | Average Primary Particle Size nm | Water Adsorption Amount Per Unit Area (mg · H₂O)/m² | Bulk Density g/ml | Dispersibility |
| Example 1 | 0.36 | 0.392 | 3.83 | 0.93 | 0.56 | ○ |
| Example 2 | 0.34 | 0.332 | 4.52 | 1.02 | 0.55 | ○ |
| Example 3 | 0.34 | 0.403 | 3.72 | 0.84 | 0.61 | ○ |
| Example 4 | 0.27 | 0.325 | 4.62 | 0.82 | 0.71 | ○ |
| Example 5 | 0.32 | 0.416 | 3.61 | 0.77 | 0.73 | ○ |
| Example 6 | 0.32 | 0.312 | 4.80 | 1.01 | 0.69 | ○ |
| Example 7 | 0.27 | 0.288 | 5.21 | 0.95 | 0.75 | ○ |
| Example 8 | 0.39 | 0.344 | 4.36 | 1.13 | 0.72 | ○ |
| Example 9 | 0.38 | 0.355 | 4.23 | 1.07 | 0.76 | ○ |
| Example 10 | 0.37 | 0.367 | 4.09 | 1.01 | 0.77 | ○ |
| Comparative Example 1 | 0.18 | 0.275 | 5.45 | 0.67 | 0.81 | Δ |
| Comparative Example 2 | 0.25 | 0.405 | 3.70 | 0.62 | 0.81 | Δ |
| Comparative Example 3 | 0.22 | 0.318 | 4.72 | 0.69 | 0.72 | x |
| Comparative Example 4 | 0.18 | 0.345 | 4.35 | 0.53 | 0.84 | x |
| Comparative Example 5 | 0.05 | 0.091 | 16.5 | 0.57 | 0.08 | ○ |
| Comparative Example 6 | 0.15 | 0.350 | 4.29 | 0.43 | 0.65 | x |

<Evaluation Results>

The evaluation results of each of the samples are shown in Table 1.

In Examples 1 to 10, the particle sizes were sufficiently small when determined based on the specific surface areas. In addition, in each of the titanium oxides of Examples 1 to 10, the anatase content was high, and the water adsorption amount per unit area exhibited an excellent value (0.7 mg/m² or higher). In addition, the bulk density was in a preferable range (0.2 g/ml to 0.8 g/ml), and the dispersibility was also high.

On the other hand, in Comparative Example 1 in which the temperature of the ion exchange water was 98° C., the BET specific surface area was not sufficient, and the particle size was large. In addition, the water adsorption amount per unit area was small, and the dispersibility was insufficient. In Comparative Example 2 in which the addition rate of the titanium tetrachloride was excessively fast (the increase rate of titanium atomic concentration (time-average) was 8.8 mmol/L/min), the water adsorption amount per unit area was small, and the dispersibility was insufficient. In Comparative Example 3 in which the addition rate of the titanium tetrachloride was excessively slow (the increase rate of titanium atomic concentration (time-average) was 0.2 mmol/L/min), the water adsorption amount per unit area was small, and the dispersibility was poor.

In Comparative Example 4 in which the titanium atomic concentration measured after the addition of the aqueous titanium tetrachloride solution was excessively high (300 mM), a large amount of rutile type crystals were formed, the water adsorption amount per unit area was small, and the dispersibility was poor. In Comparative Example 5 in which the commercially available titanium oxide was used, the BET specific surface area was not sufficient, and the particle size was large. In addition, the bulk density was low (that is, the handleability was poor), and the water adsorption amount per unit area was small. In Comparative Example 6 in which the titanium oxide was prepared using the method described in PTL 3, the water adsorption amount per unit area was not sufficient, and the dispersibility was poor.

It was found based on the above-described evaluation results that the water adsorption amount per unit area in each of the titanium oxides produced under the conditions of Examples 1 to 10 was higher than that of each of the titanium oxides of Comparative Examples 1 to 5. In addition, the particle size was sufficiently small, the bulk density was excellent, and the dispersibility was also high. Accordingly, it was found that each of the titanium oxides produced wider the conditions of Examples 1 to 10 had high dispersibility in a polar solvent such as water despite a small particle size thereof and had excellent handleability.

The invention claimed is:

1. A method of producing a titanium oxide in which titanium tetrachloride is hydrolyzed using a liquid-phase method, the method comprising:
    a step of adding an aqueous titanium tetrachloride solution to warm water having a higher temperature than the aqueous titanium tetrachloride solution,
    wherein in the step, the temperature of the warm water is 30° C. to 95° C. and the aqueous titanium tetrachloride solution is added to the warm water such that an increase rate of titanium atomic concentration in the warm water is 2.0 mmol/L/min to 5.0 mmol/L/min,
    a titanium atomic concentration in the warm water after the step is 280 mmol/L or lower,
    the titanium tetrachloride is hydrolyzed in the presence of a water-soluble organic acid having a carboxyl group and/or an inorganic acid, and
    the organic acid and/or the inorganic acid is added to the aqueous titanium tetrachloride solution in advance before adding the aqueous titanium tetrachloride solution to the warm water.

2. The method of producing a titanium oxide according to claim 1,
    wherein the organic acid and/or the inorganic acid is a polyacid.

3. The method of producing a titanium oxide according to claim 1, further comprising a dechlorination step of separating a titanium oxide and hydrochloric acid, which are produced in the step of adding the aqueous titanium tetrachloride solution, from each other using at least one selected from the group consisting of an ultrafiltration membrane, a reverse osmosis membrane, an ion exchange resin, and an electrodialytic membrane.

4. The method of producing a titanium oxide according to claim 1, further comprising a step of cooling the warm water immediately after the step of adding the aqueous titanium tetrachloride solution to the warm water.

* * * * *